(12) United States Patent
Vandyck et al.

(10) Patent No.: US 10,124,868 B2
(45) Date of Patent: Nov. 13, 2018

(54) HOUSING ELECTRICAL COMPONENTS IN A TRANSLUCENT WINGSAIL

(71) Applicant: Marine Robotics, LLC., Silver Spring, MD (US)

(72) Inventors: Vincent Vandyck, Washington, DC (US); Walter Holemans, Washington, DC (US)

(73) Assignee: Marine Robotics, LLC., Silver Spring, MD (US)

( * ) Notice: Subject to any disclaimer, the term of this patent is extended or adjusted under 35 U.S.C. 154(b) by 0 days.

(21) Appl. No.: 15/439,315

(22) Filed: Feb. 22, 2017

(65) Prior Publication Data

US 2017/0267324 A1    Sep. 21, 2017

Related U.S. Application Data

(60) Provisional application No. 62/308,519, filed on Mar. 15, 2016.

(51) Int. Cl.

| | |
|---|---|
| *B63H 9/06* | (2006.01) |
| *B63B 45/04* | (2006.01) |
| *H02S 10/40* | (2014.01) |
| *H02S 40/22* | (2014.01) |
| *H02S 30/20* | (2014.01) |
| *H02S 40/44* | (2014.01) |
| *B63B 35/00* | (2006.01) |
| *B63B 35/44* | (2006.01) |

(52) U.S. Cl.
CPC ........... *B63H 9/0607* (2013.01); *B63B 45/04* (2013.01); *B63H 9/0657* (2013.01); *H02S 10/40* (2014.12); *H02S 30/20* (2014.12); *H02S 40/22* (2014.12); *H02S 40/44* (2014.12); *B63B 2035/009* (2013.01); *B63B 2035/4453* (2013.01); *B63B 2201/20* (2013.01)

(58) Field of Classification Search
CPC ............................ B63H 9/0607; B63H 9/0657
See application file for complete search history.

(56) References Cited

U.S. PATENT DOCUMENTS

| | | | |
|---|---|---|---|
| 9,371,121 B1* | 6/2016 | Jenkins | B63H 9/0607 |
| 2010/0206303 A1* | 8/2010 | Thorne | F24J 2/16 |
| | | | 126/696 |
| 2011/0117974 A1* | 5/2011 | Spitalnik | H01R 31/06 |
| | | | 455/573 |
| 2013/0055944 A1* | 3/2013 | Poulsen | B63H 9/02 |
| | | | 114/39.3 |

(Continued)

*Primary Examiner* — Stephen P Avila
(74) *Attorney, Agent, or Firm* — Robert M. McDermott

(57) ABSTRACT

A substantially hollow wingsail is configured to enable electrical components to be situated within the wingsail. In particular, the wingsail may be configured to contain the solar panels used to power the other electrical components of the vessel, as well as other items that are conventionally situated on the exterior of the vessel, such as antennas, navigation lights, and so on. The surface of the wingsail may include transparent or translucent areas to provide light to the solar panels, as well as optical and electromagnetic reflective areas within the wingsail to enhance the performance of the solar panels and antennas. The wingsail may also include an internal light that illuminates the translucent areas of the wingsail for enhanced visibility to other vessels.

29 Claims, 3 Drawing Sheets

(56) References Cited

U.S. PATENT DOCUMENTS

| | | | | |
|---|---|---|---|---|
| 2014/0332056 A1* | 11/2014 | Chen | ................ | H02S 40/22 |
| | | | | 136/248 |
| 2015/0323399 A1* | 11/2015 | Zhao | ................ | G01L 1/22 |
| | | | | 702/42 |
| 2016/0336896 A1* | 11/2016 | Peet | ................ | H02S 20/32 |

* cited by examiner

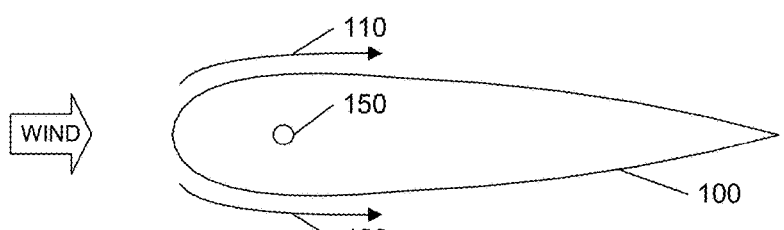
FIG. 1A [PRIOR ART]
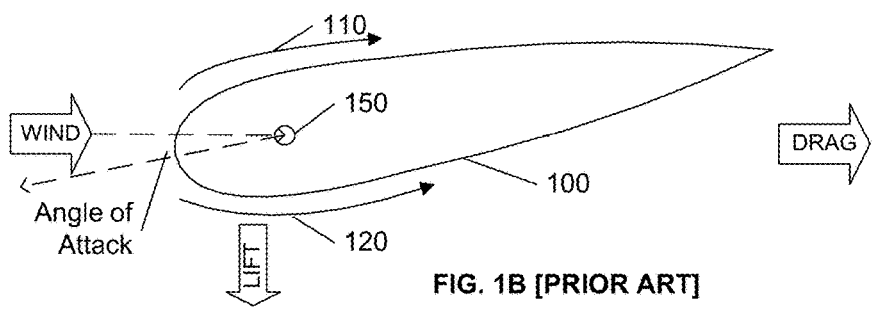
FIG. 1B [PRIOR ART]
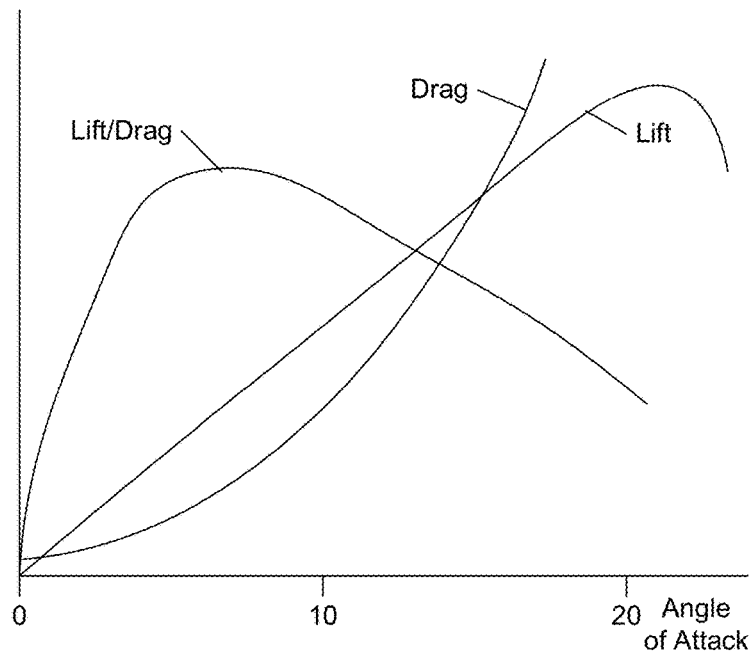
FIG. 1C [PRIOR ART]

HOUSING ELECTRICAL COMPONENTS IN A TRANSLUCENT WINGSAIL

This application claims the benefit of U.S. Provisional Patent Application 62/308,519, filed Mar. 15, 2016.

BACKGROUND AND SUMMARY OF THE INVENTION

This invention relates to the field of autonomous sailing, and in particular to mounting electrical components, such as solar panels, within a transparent wing sail.

The interest and advancements in autonomous sailing vessels are continually increasing. As disclosed in U.S. Pat. No. 8,973,511, "AUTONOMOUS SAILBOAT FOR OCEANOGRAPHIC MONITORING", issued 10 Mar. 2015 to Walter Holemans and incorporated by reference herein, fleets of such autonomous sailing vessels may be used to monitor oceanographic environmental conditions, engage in search and rescue operations, report on potential pirate activities, and so on.

Such autonomous sailing vessels may include numerous electrical devices to provide navigation, communication, monitoring, auxiliary propulsion, and so on. Conventionally, solar panels are deployed on an outer surface of the sailing vessel to provide the energy to power the electrical devices that are typically situated within the hull(s) of the sailing vessel, or other regions of the sailing vessel that are protected from the environment. Being exposed to the elements, the solar panels must include a protective exterior enclosure. Additionally, solar panels that are situated on the surface of the sailing vessel are often shadowed by the sails, which substantially limits their output energy.

Some autonomous sailing vessels are configured as catamarans, with two or more hulls for stability, as contrast to a monohull, which relies on a heavy keel for stability. These vessels are typically configured with rigid "wingsails" that rotate relative to the hull(s) of the vessel to provide 'lift' (propulsion) based on the flow of wind over the surface of the wingsail. The orientation of the wingsail relative to the direction of the wind determines the amount of lift that the wingsail generates. As contrast to "soft sails", a rigid wingsail is substantially easier to control, having fewer variables to manage, and substantially more efficient (lower drag), being able to sail 'closer to the wind' with a smaller 'angle of attack' to the wind.

FIGS. 1A and 1B illustrate an example wingsail. In FIG. 1A, the wingsail 100 is oriented directly "into the wind", and the airflows 110, 120 on each side of the wingsail 100 are equal. Accordingly, no lift is generated.

In FIG. 1B, the wingsail 100 is pivoted about a center of rotation (typically the mast of the vessel) at an angle to the wind, the angle being termed the "angle of attack". With the illustrated orientation to the wind, the airflow 120 on the "leeward" side of the wingsail (the side of the wingsail farther from the wind) will be faster than the airflow 110 on the the "windward" or "weather" side of the wingsail, and this difference in speed creates a lower pressure on the leeward side of the wingsail and a greater pressure on the windward side, thereby producing lift perpendicular to the wind direction. However, the flow of wind over the sails and the vessel introduces drag, parallel to the wind direction. The total force applied to the vessel will be the vector sum of the lift and drag. The hull(s) of the vessel in the water (not illustrated) will counteract the sideways component of the total force, and the vessel will move forward (assuming that the total force is in the intended direction of travel).

The amount of lift generated will be dependent upon the angle of attack, as will the drag, as illustrated in FIG. 1C. As illustrated, the lift increases approximately linearly with increasing angle of attack, up to a maximum. If the angle of attack is further increased, the airflow on the leeward side of the wingsail will 'separate' from the wingsail, and the pressure differential between the leeward and windward sides of the wingsail decreases rapidly, thereby 'stalling' the vessel.

The amount of wind-induced drag, on the other hand increases approximately with the square of the angle of attack. Consequently, at some point, the increase in drag will exceed the increase in lift as the angle of attack is increased, and the forward force will decrease. When sailing into the wind, the maximum forward velocity will be achieved when the ratio of lift to drag (L/D) is at its maximum, and, as illustrated in FIG. 1C, this maximum L/D occurs at an angle of attack that is substantially less than the angle of attack at which maximum lift. As can also be seen in FIG. 1C, because of the non-linear rise in drag, reducing the causes of wind-induced drag will have a substantial effect on the L/D ratio, allowing boats to sail closer to the oncoming wind.

FIG. 2 illustrates a structure of an example wingsail 200. Typically, frame elements 210 are formed to form the cross section of the wingsail using lightweight material, such as carbon fiber, and are attached, ladder-like, to a vertical element 220 to form an endoskeleton. A lightweight material, such as plastic, is applied to the endoskeleton to form the exterior surface 230 of the wingsail 200.

In addition to the wind-induced drag on the wingsail, the motion of the vessel through the water and the atmosphere also induces drag. Ideally, the shape of the vessel below the waterline is optimized for a smooth flow of water, and the shape of the vessel above the waterline is optimized for a smooth flow of air. If the aforementioned solar panels, or other components, are exposed to the air flow, they will significantly add to the drag. In the example sailing vessel that uses a wingsail, the drag that is introduced by, for example, a vertical cylindrical pole (such as an antenna) can be greater than the drag introduced by the entire wingsail. In like manner, a horizontal panel situated above an aerodynamically designed hull can introduce as much atmospheric drag as the entire hull.

It would be advantageous to provide a sailing vessel that provides a high lift-to-drag ratio. It would also be advantageous to provide a sailing vessel that provides environmental protection to electrical components, such as solar panels, so that the solar panel itself need not include a protective exterior.

These advantages, and others, can be realized by creating a substantially hollow wingsail that is configured to enable electrical components, or other components to be situated within the wingsail. In particular, the wingsail may be configured to contain the solar panels used to power the other electrical components of the vessel, as well as other items that are conventionally situated on the exterior of the vessel, such as antennas, navigation lights, and so on. The surface of the wingsail may include transparent or translucent areas to provide light to the solar panels, as well as optical and electromagnetic reflective areas within the wingsail to enhance the performance of the solar panels and antennas. The wingsail may also include an internal light that illuminates the translucent areas of the wingsail for enhanced visibility to other vessels.

BRIEF DESCRIPTION OF THE DRAWINGS

The invention is explained in further detail, and by way of example, with reference to the accompanying drawings wherein:

FIGS. 1A and 1B illustrate an example wingsail with optional tail at two different angles of attack to the wind, and FIG. 1C illustrates lift and drag as a function of the angle of attack.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

The term translucent as used herein is consistent with the term as defined in the Merriam-Webster dictionary: "Translucent: permitting the passage of light: a. clear, transparent; b. transmitting and diffusing light so that objects beyond cannot be seen clearly." Alternatively stated, as used herein translucent is defined as having a light transmission coefficient of at least 20%.

Figure 3:
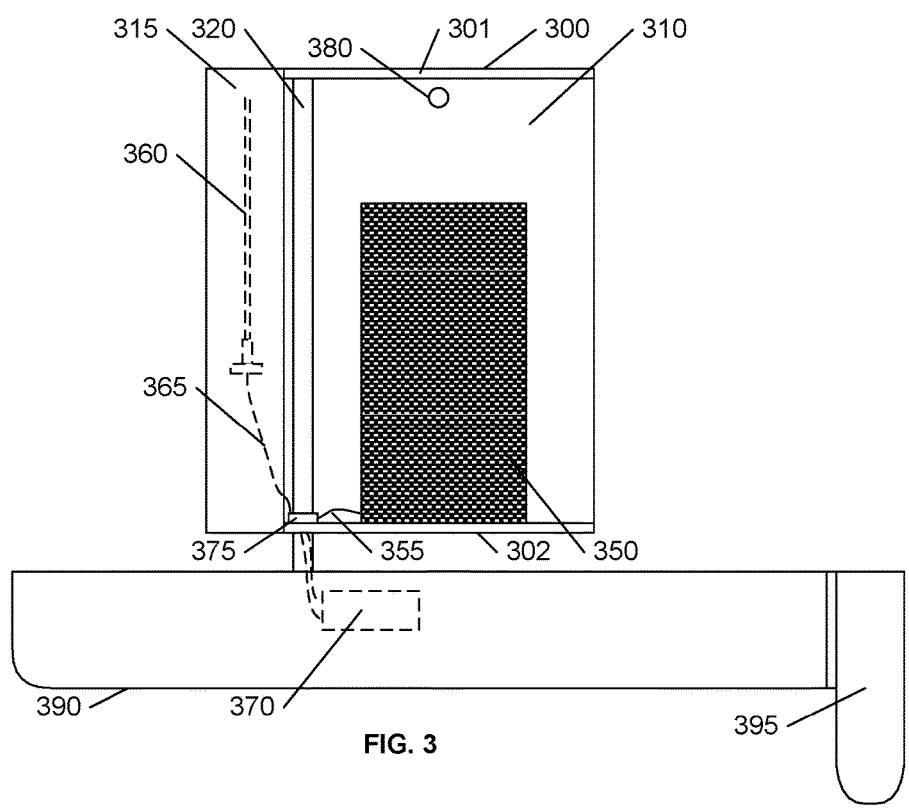
FIG. 3 illustrates an example sailing vessel with a wingsail in accordance with aspects of this invention.

FIG. 3 illustrates an example sailing vessel with a wingsail 300 in accordance with aspects of this invention. The wingsail 300 includes a translucent section 310, and an opaque section 315, although the entire wingsail may be translucent.

The wingsail 300 is situated on a mast 320 that extends vertically from the hull 390 of the vessel. The vessel includes a rudder 395 for changing the direction of travel. Not illustrated, the vessel may also include an auxiliary propulsion unit, such as a motor driven propeller.

The vessel includes one or more processing systems that control the rotation of the wingsail 300 and the rudder 395 to provide lift in a desired direction. The drift to the port or starboard of the boat caused by the lift or drag forces in the sail is counteracted when the rudder produces an angle of attack of a keel or hull with respect to the water. The angle of attack of the keel or hull is typically small compared to the angle of attack of the sail due to the greater density of the water. In operation, the rudder 395 is controlled to orient the hull(s) of the vessel in a desired direction, and the wingsail 300 is controlled to provide a desired angle of attack to the wind. One of skill in the art will recognize that the desired direction may be different from the direction to an intended destination as the vessel 'tacks' to arrive at a destination that is 'up wind' of the vessel. To enable such control of the wingsail 300 and rudder 395, the vessel may include a variety of sensing devices, such as a GPS receiver for determining the desired direction, and a sensor that provides a measure of the orientation of the wingsail 300 relative to the hull(s) of the vessel.

Figure 2:
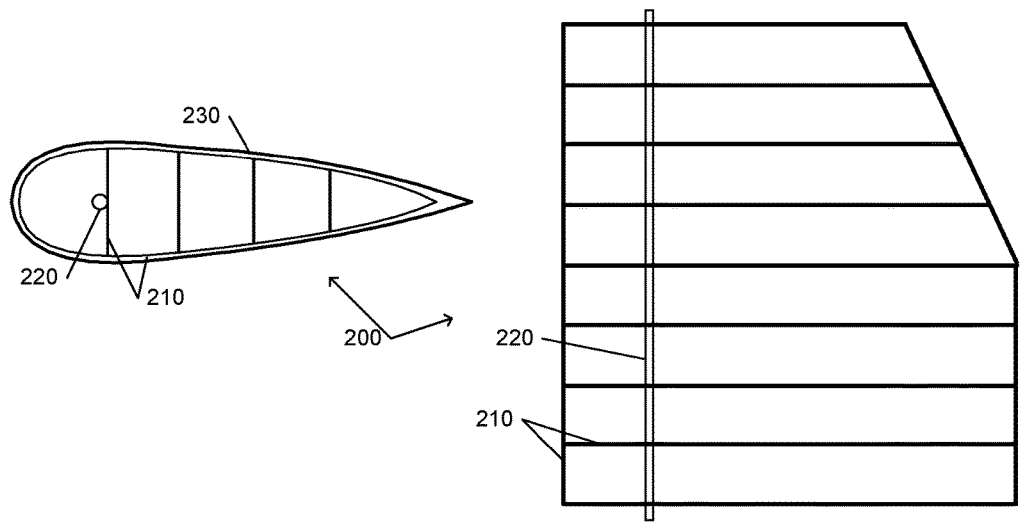
FIG. 2 illustrates a structure of an example endoskeletal wingsail.

The wingsail 300 is preferably a hollow structure, wherein the exterior surface forms an exoskeleton structure, although an endoskeleton structure, such as illustrated in FIG. 2 may be used. An exoskeleton structure is preferred for its superior structural stiffness and strength compared to the endoskeleton structure of FIG. 2.

In an exoskeleton structure, the "area moment of inertia", which determines the structure's deflection under load (stiffness), as well as the stress caused by a moment applied to the structure (strength), increases with the cube of the thickness of the external surface material forming the exoskeleton, whereas the mass of the exoskeleton only increases with the square of the thickness. That is, doubling the thickness of the exoskeleton increases its strength and stiffness by a factor of eight, whereas its mass will only double.

An endoskeleton structure that provides the same strength and stiffness will be substantially heavier than an exoskeleton structure. On a sailing vessel, the center of gravity of the mass determines the vessel's tendency to heal, or pitch. The endoskeleton's larger mass relative to the mass of the hull(s) results in a high center of gravity above the vessel, which will reduce the vessel's first mode pitching frequency, allowing the vessel to resonate with an oncoming series of waves at that pitching frequency. Additionally, a high center of gravity will increase the likelihood of the vessel flipping over and will substantially increase the difficulty of righting the vessel. Additionally, as detailed below, embodiments of this invention include components, such as solar panels, being mounted within the wingsail. An endoskeleton limits the size and positioning of such components within the wingsail.

In an embodiment, the exoskeleton may be roto-molded plastic, blow molded, or injection molded, to minimize manufacturing costs. Polyethylene is a low-cost material that is commonly used for roto-molding, although other materials, such as nylons, polycarbonate, rigid polyvinyl chloride and others may be used. These materials may also be reinforced with fiberglass, or other fibers to enable additional reduction in mass. A further advantage of roto-molding is that the rounded corners produced by roto-molding are generally thicker than the adjoining walls, further increasing the strength and rigidity without substantially adding to the mass of the wingsail.

In accordance with aspects of this invention, the wingsail 300 may be configured to house electrical components, such as one or more solar panels 350. To enable the use of a solar panel 350 within the wingsail 300, at least a portion 310 of the wingsail 300 is translucent.

In an embodiment of this invention, the top 301 or the bottom 302 of the wingsail, or both, is a removable panel to facilitate mounting the components within the wingsail 300. For example, the components may be mounted on the bottom panel 302 of the wingsail 300, and the hollow remainder of the wingsail 300 may be placed over the components and sealed to the bottom panel 302. An endoskeleton structure would not provide such an ease of assembly.

Additionally, such an embodiment enables all of the components within the wingsail 300 to be integrated and tested with the components 370 that are external to the wingsail 300 before the within-sail components are sealed within the wingsail. Optionally, the bottom panel 302 may be a skeletal structure, to facilitate heat dissipation from the components within the wingsail 300.

Alternatively, the wingsail 300 may be formed as a pair of "clam shells", wherein the wingsail is bisected laterally. The components may be mounted within one shell, and then the other shell may be secured in place to form the wingsail 300.

In the example embodiment of FIG. 3, the solar panel 350 is mounted vertically, as contrast to the conventional horizontal orientation of solar panels. Although this vertical orientation reduces the amount of directly overhead sunlight that the solar panel 350 will receive, the inventors have recognized that the typical sailing environment provides a substantial amount of reflective and diffuse light. The vertical orientation may also be more efficient than the conventional horizontal orientation in regions (or during seasons) when the sun is rarely directly overhead, such as regions close to poles. Placing the solar panels 350 in the wingsail 300 also avoids the 'masking' of conventional horizontal solar panels by the sail. Additionally, advances in solar panel technology has provided for solar panel technology that is almost equally efficient in direct, reflective, or diffuse light.

It is noted that solar panels are known to be placed on the surface of a sail. However, this requires that the solar panels be flexible, or preformed to a given aerodynamic shape. By placing the solar panels within the wingsail, conventional rigid flat panels may be used, with a substantial savings in cost compared to flexible or shaped solar panels. Internally situated solar panels will also introduce significantly less drag than panels that are attached to the exterior surfaces of the wingsail.

Figure 4A:
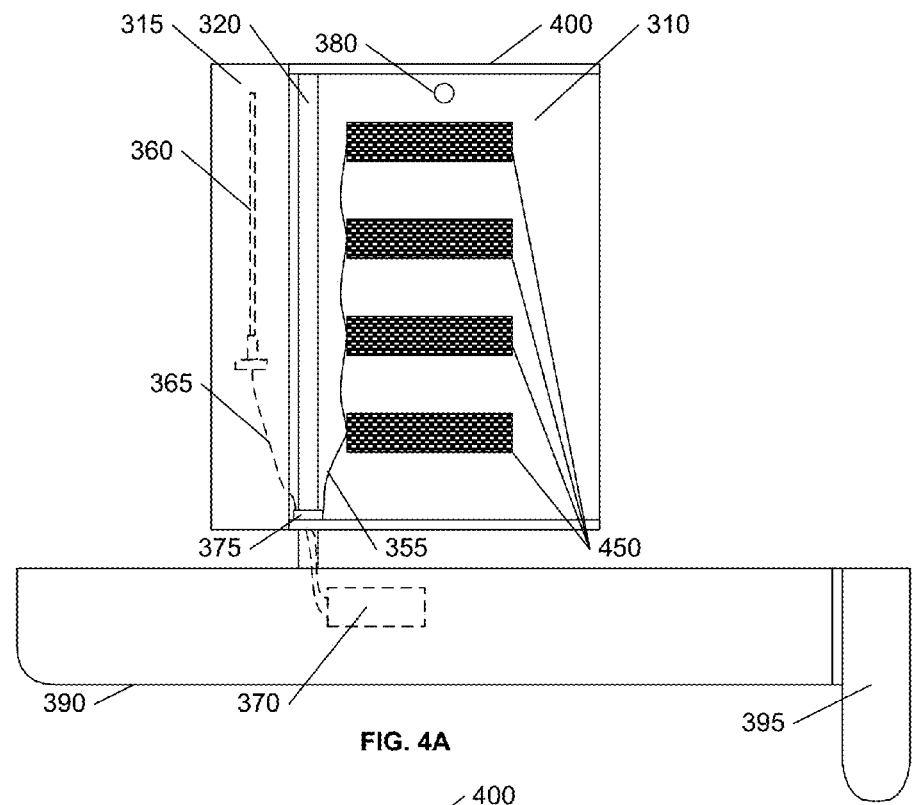
FIGS. 4A and 4B illustrate another example sailing vessel with a wingsail in accordance with aspects of this invention.
Figure 4B:
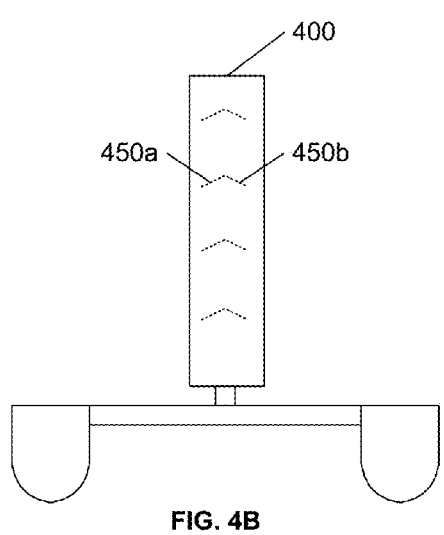

To further capture direct sunlight, the wingsail may be configured to have stacked solar panels, such as illustrated in FIGS. 4A, 4B. In this embodiment, pairs of solar panels 450 are suspended within the wingsail. The panels 450*a* and 450*b* of each pair 450 are tilted with respect to horizontal, and may be rotatable to change the tilt angle. In some embodiments, the tilt of the panels 450 may be self-controlled to optimize energy production. The panel pairs 450 are spaced apart vertically to reduce the shading of one panel by another. One of skill in the art will recognize that a combination of vertical panels 350 and horizontal panels 450 may be used, and that other solar panels may also be situated on the vessel.

The solar collection may be further increased by making some of the surfaces within the wingsail reflective. For example, in FIG. 3, the interior surface of the bottom panel 302 of the wingsail may be coated with a reflective material to reflect sunlight up toward the solar panel 350. In like manner, the underside of each panel pair 450, or the interior surface of the top 301 of the wingsail may be reflective, to reflect light from the water's surface onto the panel pair 450 beneath it. In like manner, the interior surface of the opaque portion 315 of the wingsail 300, 400 may be reflective.

As illustrated in FIG. 3, the solar panels 350 provide power to the electrical components 370 used for navigation, communication, data collection, propulsion, and so on. Although illustrated as a single entity, the components 370 may be distributed throughout the vessel.

Because the wingsail 300 rotates about the mast 320, the connections 355, 365, from devices 350, 360 within the wingsail 300 to the other components 370 will typically be accommodated via a "slip-ring" interface 375 to the mast 320. Alternatively, or as an option in the event of failure of the interface 375, the power from the solar panels and other electrical signals may be communicated to/from the components 370 via a wireless connection. For example, the slip-ring 375 may be replaced by one or more coils of wire surrounding the mast 320 that transfer power and/or signals to one or more coils of wire within the mast 320 via electromagnetic induction. A flexible cable may also be used when the rotation of the sail does not exceed the slack available in a flexible cable.

As also illustrated in FIG. 3, the wingsail 300 may be configured to contain other electronic equipment, such as an antenna 360 that is coupled to a communications device of the components 370. The antenna 360 may also be a metallic strip laminated on an inside surface of the wingsail 300, such as a strip of copper tape. Optionally, the communications device may be situated within the wingsail 300, and the coupling 365 to the components 370 will serve to communicate the demodulated information to the components 370. In like manner, other components, such as processors, may be situated either within the wingsail 300 or external to the wingsail 300.

As in the example use of reflective surfaces for increasing solar collection, portions of the wingsail 300 may include electromagnetic-wave reflectors to increase the effective receive or transmit power of the antenna 360. For example, the forward edge 315 of the wingsail 300 is somewhat parabolic, and coating this edge (either internally or externally) with electromagnetic-wave reflective material will provide a parabolic antenna for transmitting or receiving signals at the 'focal point' of the parabola.

This parabolic antenna will increase the gain of the antenna for signals arriving from (or transmitted toward) the rear of the wingsail 300, and decrease the gain for signals arriving from (or transmitted toward) the front of the wingsail 300. In an embodiment of this invention, the wingsail 300 may periodically be 'aimed' for a short period of time to transmit or receive signals to or from a desired direction, or to enable 'steering' of other equipment, such as an optical sensor, to locate a search light or warning buoy. The decreased transmission gain toward the front of the wingsail 300 may also serve to minimize the detection of such transmissions by potential 'targets' toward which the vessel is traveling.

In an example embodiment, the wingsail 300 may also include a light 380 that serves to illuminate the interior of the wingsail, thereby increasing the visibility of the vessel via the translucent portion 310 of the wingsail. Although not illustrated, in an embodiment of this invention, navigation lights (red, green) may be situated on the mast 320, and a portion of the front 315 of the wingsail may be translucent to enable these lights to be seen. As contrast to external light fixtures, providing lights within the wingsail will not introduce drag.

Although not illustrated, one of skill in the art will recognize that other electric or electronic devices may be situated within the wingsail 300, including, for example cameras, antennas, phased array radar, acoustic sensors or emitters, heat collectors or diffusers, and so on. Additionally, a Sterling engine may be realized by coupling cold sea water with the hot air of the inside of the wingsail 300A component of the thermodynamic cycle of the Sterling engine could also be used to filter or distill the air within the vessel to inhibit condensation or increase the efficacy of other components.

One of skill in the art will recognize the inherent advantages of placing components within a wingsail. In addition to the elimination of drag compared to the external mounting of components, the wingsail provides environmental protection to the components within the wingsail, and in particular, substantially reduces the damage that may be produced when waves crash upon the surface of the vessel. This environmental protection enables the use of less costly components within the wingsail, compared to components that must be designed to withstand severe environmental condition, such as experienced on the open seas.

The foregoing merely illustrates the principles of the invention. It will thus be appreciated that those skilled in the art will be able to devise various arrangements which, although not explicitly described or shown herein, embody the principles of the invention and are thus within its spirit and scope. For example, prismatic surfaces, like those found in Fresnel lenses may be molded into the sail, parallel to streamlines having the effect of focusing either the incoming energy or emitted energy. Additionally, although this invention is presented in the context of an autonomous vessel, one of skill in the art will recognize that the principles of this invention may be applied to any sailing vessel, including for example, cruising or racing sailboats and commercial or recreational motorsailers. These and other system configuration and optimization features will be evident to one of ordinary skill in the art in view of this disclosure, and are included within the scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) any of the disclosed devices or portions thereof may be combined together or separated into further portions unless specifically stated otherwise;

e) no specific sequence of acts is intended to be required unless specifically indicated; and f) the term "plurality of" an element includes two or more of the claimed element, and does not imply any particular range of number of elements; that is, a plurality of elements can be as few as two elements, and can include an immeasurable number of elements.

We claim:

1. A wingsail comprising:
   an exterior shell that includes at least a translucent area, permitting light to enter an interior region of the wingsail;
   one or more solar panels situated within the interior region that receive the light and provide electrical energy; and
   an electrical interface that enables communication of the electrical energy to components exterior to the wingsail.

2. The wingsail of claim 1, wherein at least a portion of the interior region includes an optically reflective surface.

3. The wingsail of claim 1, including an antenna within the interior region, and an antenna interface that enables coupling to the antenna.

4. The wingsail of claim 3, wherein at least a portion of the interior region includes an electromagnetically reflective surface.

5. The wingsail of claim 1, including a light source within the interior region of the wingsail that illuminates at least a portion of the interior region and projects light through the translucent area.

6. The wingsail of claim 1, wherein the exterior shell forms an exoskeleton of the wingsail.

7. The wingsail of claim 1, wherein the exterior shell includes two detachable shells.

8. The wingsail of claim 1, wherein the wingsail includes a detachable panel that facilitates installation of the solar panels.

9. The wingsail of claim 8, wherein the solar panels are affixed to the detachable panel.

10. The wingsail of claim 1, wherein the wingsail includes a translucent portion that enables visibility of navigation lights within the wingsail.

11. The wingsail of claim 1, wherein the electrical interface is a wireless interface.

12. The wingsail of claim 1, wherein the electrical interface includes a slip- ring.

13. The wingsail of claim 1, wherein at least a portion of the translucent area of the wingsail includes a lens.

14. The wingsail of claim 13, wherein the lens comprises a Fresnel lens.

15. The wingsail of claim 1, including one or more additional devices within the interior of the wingsail.

16. The wingsail of claim 15, wherein the one or more additional devices include at least one of: a camera and an optical sensor.

17. The wingsail of claim 15, wherein the one or more additional devices includes a phased array radar.

18. The wingsail of claim 15, wherein the one or more additional devices include at least one of: an acoustic sensor and an acoustic emitter.

19. The wingsail of claim 15, wherein the one or more additional devices include at least one of:
   a heat collector and a heat diffuser.

20. A sailing vessel comprising:
   one or more hulls;
   a mast section attached to the one or more hulls;
   a wingsail coupled to the mast section;
   wherein the wingsail comprises:
      an exterior shell that includes at least an area that is translucent, permitting light to enter an interior region of the wingsail;
      one or more solar pane situated within the interior region that receive the light and provide electrical energy; and
      an electrical interface that enables communication of the electrical energy to components exterior to the wingsail.

21. The sailing vessel of claim 20, wherein at least a portion of the interior region of the wingsail includes an optically reflective surface.

22. The sailing vessel of claim 20, including an antenna within the interior region of the wingsail, and an antenna interface that enables coupling to the antenna to components exterior to the wingsail.

23. The sailing vessel of claim 22, wherein at least a portion of the interior region of the wingsail includes an electromagnetically reflective surface.

24. The sailing vessel of claim 20, including a light source within the interior region of the wingsail that illuminates at least a portion of the interior region and projects light through the translucent area.

25. The sailing vessel of claim 20, wherein the mast section includes a light source, and the wingsail is configured to enable projecting light from the light source in the mast section through the exterior shell.

26. The sailing vessel of claim 25, wherein the light source projects red and green light that conform to rules of navigation.

27. The sailing vessel of claim 20, including a processing system that controls an orientation of the wingsail relative to the one or more hulls.

28. The sailing vessel of claim 20, including an orientation sensing element that communicates a measure of the orientation of the wingsail relative to the one or more hulls to the processing system.

29. The sailing vessel of claim 20, including a Sterling engine that couples sea water to heat produced within the wingsail to produce energy.

\* \* \* \* \*